United States Patent
Kikuchi et al.

(10) Patent No.: US 7,624,993 B2
(45) Date of Patent: Dec. 1, 2009

(54) DUAL-MEMBERED SUCTIONAL GASKET

(75) Inventors: Yutaka Kikuchi, Kitaadachi-gun (JP); Hirofumi Hino, Kitaadachi-gun (JP); Masaki Ueno, Wako (JP); Masaaki Yamaguchi, Wako (JP); Yasuaki Nagai, Wako (JP)

(73) Assignees: Kokoku Intech Co. Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/664,041

(22) PCT Filed: Jul. 27, 2005

(86) PCT No.: PCT/JP2005/013710
§ 371 (c)(1),
(2), (4) Date: Mar. 29, 2007

(87) PCT Pub. No.: WO2006/035544
PCT Pub. Date: Apr. 6, 2006

(65) Prior Publication Data
US 2008/0067760 A1 Mar. 20, 2008

(30) Foreign Application Priority Data
Sep. 28, 2004 (JP) ............................. 2004-281378

(51) Int. Cl.
*F16J 15/02* (2006.01)
(52) U.S. Cl. .................. 277/641; 277/647; 277/649; 277/928
(58) Field of Classification Search ......... 277/647–649, 277/641, 928; 220/203.11, 203.12
See application file for complete search history.

(56) References Cited

U.S. PATENT DOCUMENTS

| | | | | | |
|---|---|---|---|---|---|
| 2,754,136 | A | * | 7/1956 | Phillips | 277/322 |
| 2,820,569 | A | * | 1/1958 | Peterson | 220/203.12 |
| 2,853,330 | A | * | 9/1958 | Harry | 277/649 |
| 2,882,081 | A | * | 4/1959 | Tobias | 277/394 |
| 2,908,480 | A | * | 10/1959 | Hamer | 251/328 |
| 2,910,209 | A | * | 10/1959 | Nelson | 220/378 |
| 2,981,232 | A | * | 4/1961 | Peras | 91/416 |

(Continued)

FOREIGN PATENT DOCUMENTS
DE 256905 5/1998

(Continued)

*Primary Examiner*—Alison K Pickard
(74) *Attorney, Agent, or Firm*—James Creighton Wray; Meera P. Narasimhan

(57) ABSTRACT

The invention provides a novel dual-membered suctional gasket which has a reliable function to fit and fix the gasket to an object to be sealed, and also provides an effective suction effect and air venting function. For that purpose, the gasket which has a function to prevent fluid from leaking when compressed, comprises an inner sealing member 1 and outer sealing member 2 arranged on a surface perpendicular to a compressing direction; and a plurality of connecting members 3 for connecting and fixing the inner sealing member 1 and the outer sealing member 2 together. Suction cup structures are formed, when a proper amount of air closed between the inner sealing member and the outer sealing member is vented from the inner sealing member, the outer sealing member or the both sealing members by compressing the dual-membered gasket.

2 Claims, 5 Drawing Sheets

U.S. PATENT DOCUMENTS

| | | | | |
|---|---|---|---|---|
| 2,983,533 | A * | 5/1961 | Tisch | 277/649 |
| 3,031,200 | A * | 4/1962 | Hamer | 277/500 |
| 3,290,047 | A * | 12/1966 | Mayer | 277/647 |
| 3,831,950 | A * | 8/1974 | Bentley et al. | 277/649 |
| 4,337,956 | A * | 7/1982 | Hopper | 277/552 |
| 4,372,565 | A * | 2/1983 | Lien | 277/614 |
| 4,434,909 | A * | 3/1984 | Ott | 220/316 |
| 4,441,724 | A * | 4/1984 | Taylor | 277/640 |
| 4,511,152 | A * | 4/1985 | Fournier | 277/612 |
| 4,579,041 | A * | 4/1986 | Organ et al. | 91/437 |
| 4,884,723 | A * | 12/1989 | Dugge | 222/542 |
| 5,169,160 | A * | 12/1992 | Gaskill et al. | 277/438 |
| 5,280,769 | A * | 1/1994 | Yates | 123/184.54 |
| 5,328,178 | A * | 7/1994 | Nies | 277/438 |
| 5,429,374 | A * | 7/1995 | Eichenberger | 277/552 |
| 5,493,954 | A * | 2/1996 | Kostohris et al. | 92/168 |
| 5,641,085 | A * | 6/1997 | Lonbardo | 220/203.12 |
| 5,676,373 | A * | 10/1997 | Sakai et al. | 277/648 |
| 5,765,714 | A * | 6/1998 | Nakano et al. | 220/619 |
| 6,340,162 | B1 * | 1/2002 | Hobaugh, II | 277/594 |
| 6,523,833 | B1 * | 2/2003 | Ishigaki et al. | 277/650 |
| 6,672,595 | B2 * | 1/2004 | Park | 277/628 |
| 6,688,608 | B2 * | 2/2004 | Doyle | 277/604 |
| 6,905,125 | B2 * | 6/2005 | Shibata et al. | 277/626 |

FOREIGN PATENT DOCUMENTS

| | | |
|---|---|---|
| GB | 2127910 | 4/1984 |
| JP | 45-3221 Y | 2/1970 |
| JP | 56-114589 | 9/1981 |
| JP | 59-062775 | 4/1984 |
| JP | 2-127859 | 10/1990 |
| JP | 2-266163 A | 10/1990 |
| JP | 8-013594 | 1/1996 |
| JP | 10-259875 | 9/1998 |
| JP | 11/108192 | 4/1999 |
| JP | 2002-282118 | 10/2002 |
| JP | 15-172453 A | 6/2003 |
| JP | 2003-294145 A | 10/2003 |
| WO | WO 03/016756 | 2/2003 |

* cited by examiner

DUAL-MEMBERED SUCTIONAL GASKET

This application claims the benefit of Japanese Application No. 2004-281378 filed Sep. 28, 2004 and PCT/JP2005/013710 filed Jul. 27, 2005, which are hereby incorporated by reference in their entirety.

BACKGROUND OF THE INVENTION

1. Field of the Invention

The present invention relates to a dual-membered suctional gasket with a reliable gastighness attained by a dual-structure having a sealing function comprising an inner member and an outer member, and the gasket is applicable to various purposes.

2. Brief Description of the Related Art

Such gaskets having merely dual-membered sealing portions constituted by inner members and outer members have been known (see for example, Japanese laid open utility model No. 2-127859 and Japanese laid open patent No. 10-259875).

In some case, elasticity of whole walls of sealing portions in a gasket is reduced to a quite low level in order to enhance a sealing performance of the gasket (see Japanese laid open patent No. 8-13594).

Further, in some case, a gasket having measures to prevent the gasket from falling off and falling down has been also known (see Japanese laid open patent No. 2003-172453).

The dual-membered gaskets in the above-cited references are basically constituted by inner, outer sealing members and solid connecting members for connecting the inner and outer sealing members together, and are attached to objects to be sealed by fitting the gaskets to recessed portions of the objects. The above-cited references only disclose that inner and outer sealing members can prevent the gaskets from falling off or falling down and show suction effects. However, the gaskets disclosed in these cited references do not sufficiently attain fitting reliabilities of the gaskets to the objects to be sealed, performances of the suction effects and reliable air venting operations.

SUMMARY OF THE INVENTION

The present invention is carried out in view of the above-mentioned problems in order to provide a novel dual-membered suctional gasket which has a reliable function to fit and fix the gasket to an object to be sealed, and also in order to provide an effective suction effect and air venting function.

The above-mentioned problems are solved by gaskets constituted in the following ways.

(1) A dual-membered suctional gasket, which has a function to prevent fluid from leaking when compressed, comprising: an inner sealing member and outer sealing member arranged on a plane perpendicular to a compressing direction; and a plurality of connecting members for connecting and fixing the inner sealing member and the outer sealing member together, wherein: suction cup structures are formed, when a proper amount of air closed between the inner sealing member and the outer sealing member is vented from the inner sealing member, the outer sealing member or the both sealing members by compressing the dual-membered gasket.

(2) The dual-membered gasket according to (1), wherein: the gasket has air vent valve structures arranged in some portions of the inner sealing member, the outer sealing member or the both sealing members.

(3) The dual-membered gasket according to (1) or (2), wherein: portions of the inner sealing member, the outer sealing member or the both sealing members are formed as a lip seal structure of which reaction force against bending is smaller than that of other portions.

(4) The dual-membered gasket according to (1), wherein: a function to prevent the sealing members from falling off is added to the connecting members.

(5) The dual-membered dual gasket according to either one of (1) to (4), wherein: a function to prevent the sealing members from falling off are added to the connecting members by forming fitting holes between the neighboring connecting members such that the fitting holes are fitted to fitting portions of an object to be sealed.

(6) The dual-membered gasket according to either one of (1) to (3), wherein: the inner sealing member and the outer sealing member are formed out of different materials.

The gasket by the present invention comprises the inner sealing member and the outer sealing member arranged on the plane perpendicular to the compressing direction and the inner sealing member and the outer sealing member are connected and fixed together by a plurality of the connecting members. And air venting valves are formed in the gasket such that a proper amount of air closed in recessed portions between the inner sealing member and the outer sealing member is vented, so that a suction effect is attained and a sealing performance is enhanced, when the dual-membered gasket is compressed.

Since air pressure between the inner sealing member and the outer sealing member is adjusted by the air vent valves, irregular deformations of the sealing members and excessive reaction force against the object to be sealed can be avoided.

Since a width of the connecting members can be set wider than that of corresponding fitting portions of the object to be sealed, the function to prevent the gasket from falling off can be added by utilizing elasticity of the gasket. The connecting members can suppress the inner and outer sealing members from falling down.

Since the fitting holes are formed between the neighboring connecting members, fitting portions such as central walls can be formed on the object to be sealed. And the central walls can be used as guides to determine positions and compressed extents of the sealing members and can function as a member having self-sealing effect when a high pressure is applied to the gasket.

If the inner sealing member and the outer sealing member are formed out of different materials, proper sealing performance against different fluids can be attained in the respective sealing members.

The inner sealing member, the outer sealing member and the connecting members are arranged not necessarily on the same plane, but can be arranged freely on different planes depending on fluids to be sealed, required sealing performances and the like.

BRIEF DESCRIPTION OF THE DRAWINGS

FIGS. 9A and 9B are cross-sectional views of portion P in FIG. 8. FIGS. 9C and 9D are cross-sectional views of portion Q in FIG. 8. Areas hatched by a dashed line shows portions of the object to which the gasket is fitted.

DETAILED DESCRIPTION OF THE PREFERRED EMBODIMENTS

Figure 1:
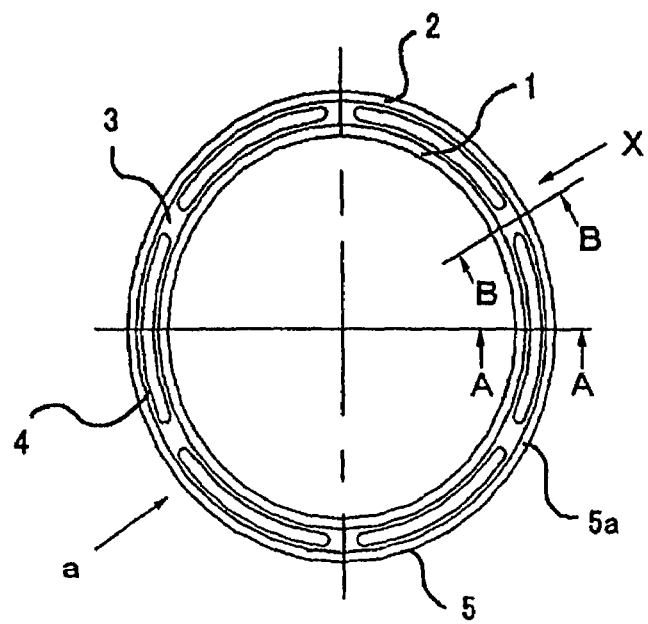
FIG. 1 is a plan view illustrating a dual-membered suctional gasket as an embodiment by the present invention.

Hereinafter, the gaskets by the present invention applied to the fuel tanks are explained as referring to drawings.

A main body "a" of the dual-membered suctional gasket comprises an inner sealing member 1, an outer sealing member 2, connecting members 3 for connecting the two sealing members 1, 2 and recessed portions 4 formed on at least one of the upper side and the lower side of the gasket. The main body "a" of the suctional gasket is made of any elastic material as far as the material can prevent fluid from leaking when compressed, such as rubber, plastic or the like. The gasket can be formed in either a circular shape or in a non-circular shape.

Figure 2:
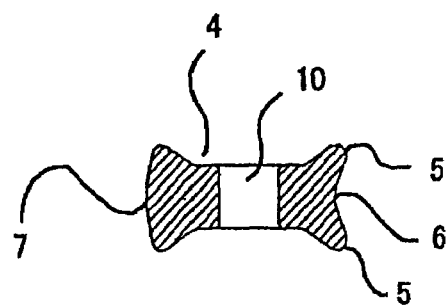
FIG. 2 is an enlarged cross-sectional view along line A-A in FIG. 1.
Figure 3:
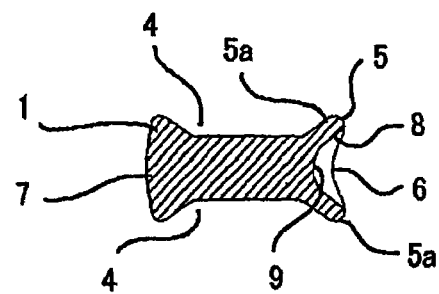
FIG. 3 is an enlarged cross-sectional view along line B-B in FIG. 1.
Figure 4:
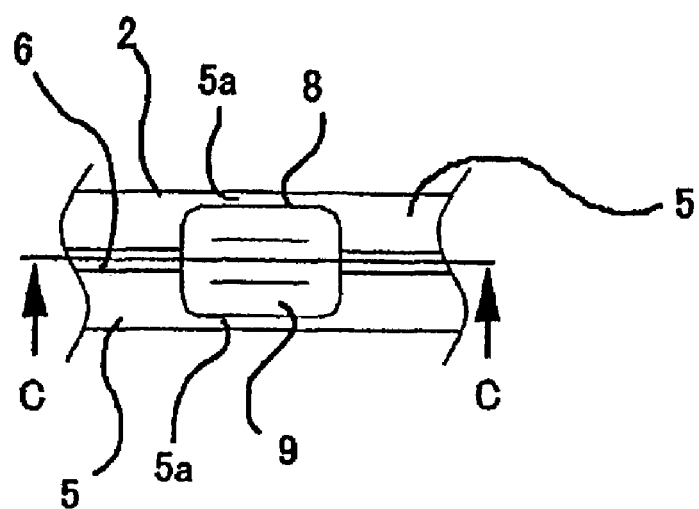
FIG. 4 is a partially enlarged side view viewed from direction X in FIG. 1.

A reference numeral "5" is lip portions of the outer sealing member 2. The upper and lower lip portions 5 of the outer sealing member 2 form a < shaped cross section and form an annular recessed portion 6 on an outer circumference of the outer sealing member 2 (see FIGS. 2 and 3). As shown in FIGS. 2 and 3, a convex portion 7 is formed on an outer circumference of the inner sealing member 1, but lip portions same as those of the outer sealing member 2 can be formed on the inner sealing member 1 instead of the convex portion.

Although not illustrated in the drawings, the gasket can arrange reversely such that the outer sealing member 2 has the convex portion and the inner sealing member has lip portions.

Figure 8:
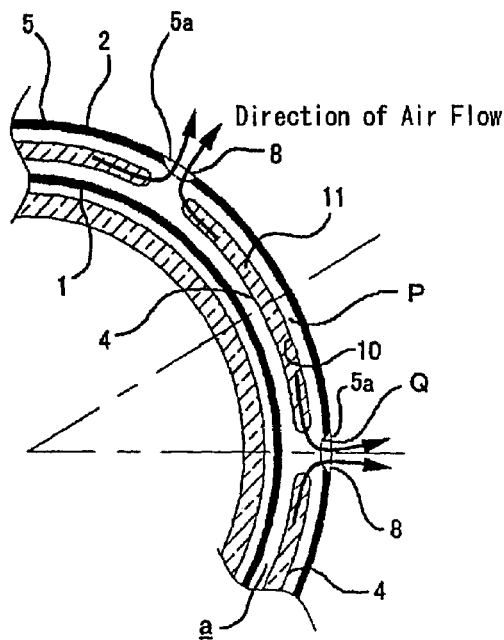
FIG. 8 is a partially enlarged explanatory view of the dual-membered gasket illustrating an air venting status from an air vent valve portion. Areas hatched by a dashed line show portions of an object to which the gasket is fitted.

A reference numeral "8" is air vent valve portions. The air vent valve portions 8 are formed at portions on the outer circumference of the outer sealing member 2 connecting to connecting members 3, such that small recessed portions 9 are formed at the recessed portion 6. Lip portions 5a at the small recessed portions 9 are formed thinner than the other lip portions 5. As a result elastic deformation performance around the lip portions 5a are weakened so that portions around the lip portion 5a are constituted to vent air remaining in the recessed portions 4 of the main body "a" of the gasket, when the sealing members 1, 2 are elastically deformed as illustrated in FIG. 8.

In the above-mentioned way air pressure in the recessed portions 4 are lowered so that recessed portions 4 work as suction cups. Consequently, the air vent valve portions 8 enhance a seal effect of the gasket and functions as check valves to prevent air flowing from outside, since portions around the air vent portions 8 have < shaped cross sections.

When a width of the connecting member 3 is set larger than a width of the object to which the gasket is fitted, a function to prevent the gasket from falling off can be added by utilizing elasticity of the gasket. Further the connecting members 3 also can prevent the inner and outer sealing members 1, 2 from falling down irregularly. Since the function to prevent the gasket from falling off can be added to respective connecting members 3 apart from each other positioned between the inner and outer sealing members 1, 2, uniform stress is acted on respective sealing members 1, 2 so the uneven deformations on the gasket are minimized.

Figure 5:
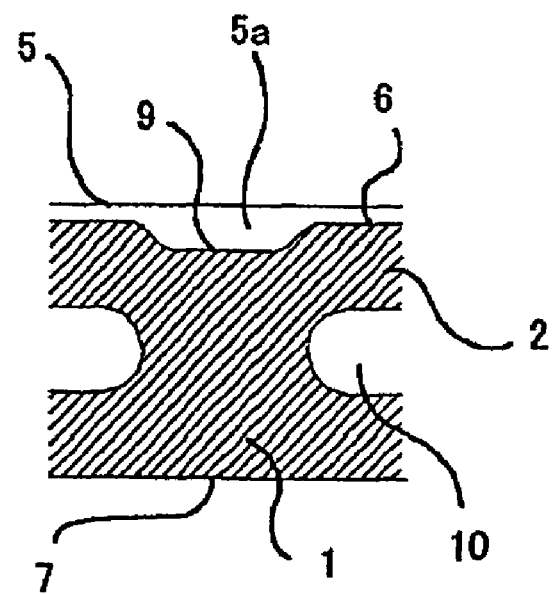
FIG. 5 is a cross-sectional view along line C-C in FIG. 4.

A reference numeral "10" is fitting holes formed between the neighboring connecting members 3 (see FIGS. 2 and 5). The fitting holes 10 are fitted to protruded central walls 11, namely, fitting members formed on the object to which the gasket to be fitted (see FIGS. 7, 8, 9A-9B). The central walls 11 function as guides to determine positioning and compressed degree of the gasket when fitted and function as a self sealing effect when higher pressure is acted on the gasket.

Figure 6:
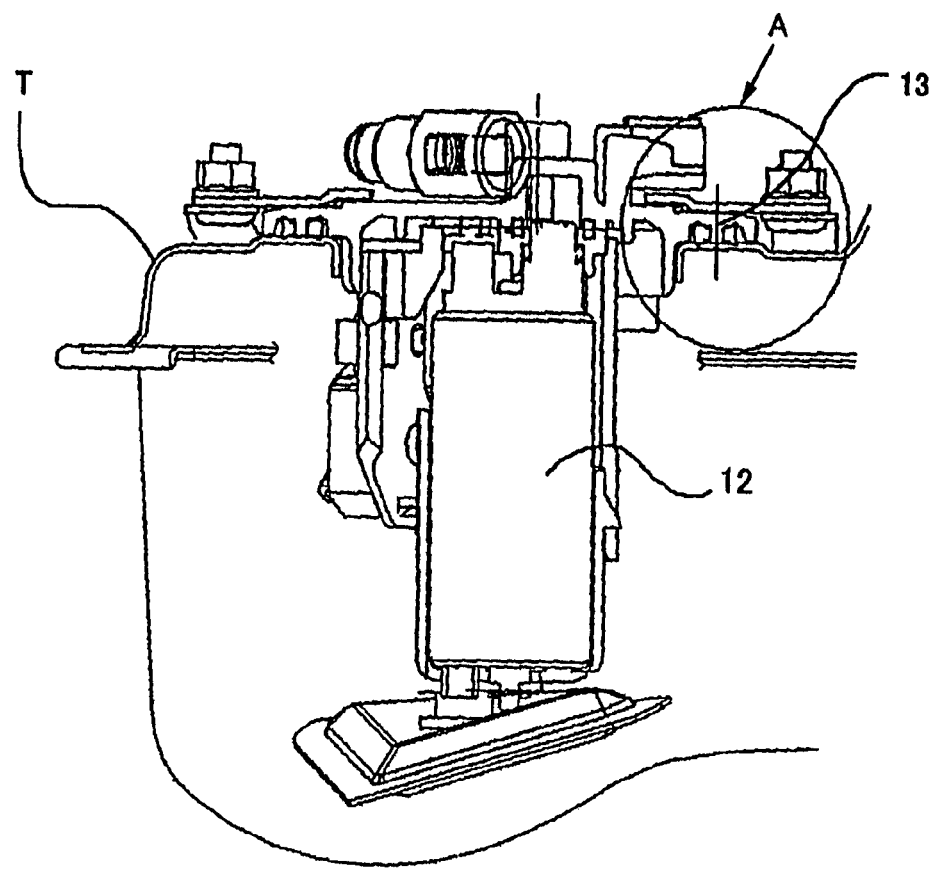
FIG. 6 is an explanatory cross-sectional view illustrating the dual-membered suctional gasket by the present invention fitted to a fuel tank.
Figure 7:
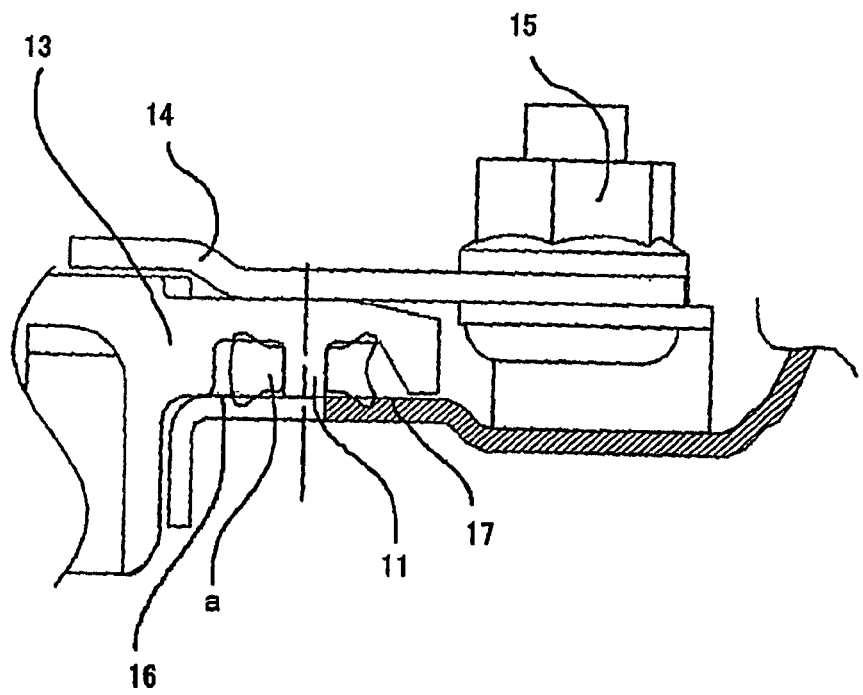
FIG. 7 is an enlarged cross-sectional view of a portion surrounded by circle A in FIG. 6, where the dual-membered gasket is in an inactive state. A hatched area in this drawing shows a painted portion of the fuel tank.

A reference numeral "12" is a fuel pump arranged on a fuel tank T to which the dual-membered suctional gasket by the present invention is fitted (see FIGS. 6 and 7). A reference numeral "13" is a fuel pump flange of which central walls 11 are fitted in the fitting holes 10 of the dual-membered suctional gasket for fitting to the fuel pump. A reference numeral "14" is a pressing plate for fixing the fuel pump flange 13 by screwing a flanged nut 15. A reference numeral "16" is an unpainted surface area of the fuel tank T. A reference numeral "17" is a painted surface area of the fuel tank T.

Hereinafter effects attained by the above-explained constitutions are explained.

Figure 9A:
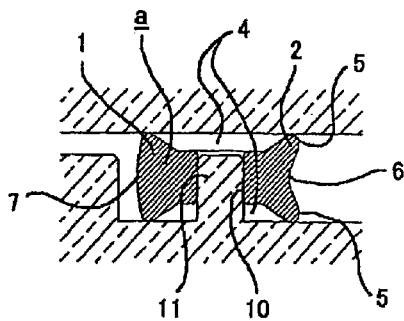
FIGS. 9A, 9B, 9C and 9D are partially enlarged explanatory cross-sectional views illustrating active states of the dual gasket.
Figure 9B:
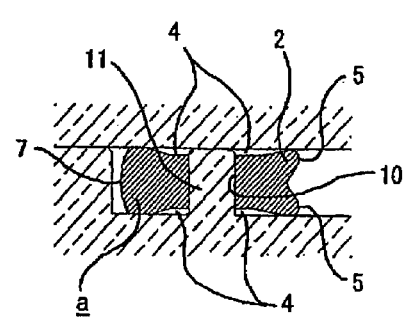
Figure 9C:
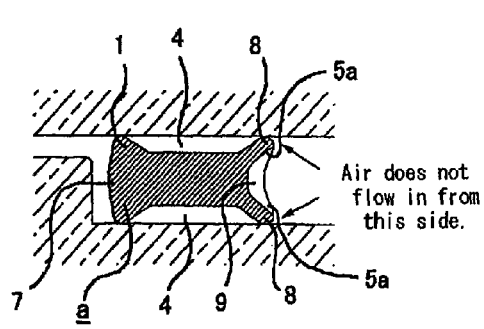

As shown in FIG. 7, the main body "a" of the suctional gasket is fitted to the central walls 11 of the object via fitting holes 10, so that the whole body of the gasket is fitted in the object (see FIGS. 9A and 9C).

Figure 9D:
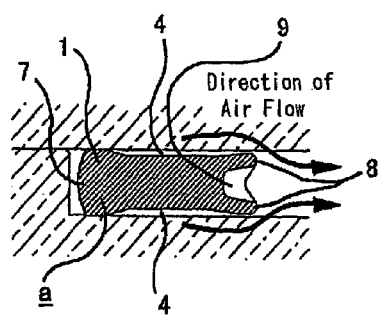

Air sealed in the recessed portions 4 of the main body "a" of the suctional gasket is compressed by deformations of the inner and outer sealing members 1, 2 when the fuel pump flange 13 is pressed during the fitting step, and then the compressed air is vented outside via air vent valve portions 8 formed outsides of the connecting members 3 as shown in FIG. 8 and FIG. 9D. Since the lip portions 5 of the outer sealing member 2 have no air vent valve portions 8 as shown in FIG. 9B, lip portions 5 are kept being sealed and are slightly bent such that the recessed portions 6 form a deeper < shaped cross section.

Since the suction effect is caused by lowered air pressure in the recessed portions 4 by venting air therefrom, sticking performance of the gasket to the object is enhanced so that a gastightness of the gasket is remarkably increased. The lip portions 5a have the same > shape cross section as the lip portions 5, but the lip portions 5a are thinner than the lip portions 5. In other words, the lip portions 5a form the deeper recessed portions 9 and the air vent valve portions 8 so that lip portions 5a can vent gas outside, but cannot intake gas inside. As a result, the air vent valve portions 8 have a sort of check valve structure so that gas does not flow into the recessed portions 4, even if the recessed portions 4 are under lowered pressure.

Consequently, the gasket by the present invention can enhance the sealing effect.

When the fuel tank T is made of steel, a sealing surface area of the tank for preventing fuel from leaking is not painted in order to avoid poor sealing performance caused by thickness fluctuations of coated paint on the sealing surface area. However, since unpainted surface areas of the tank might be rusted by penetrated water from outside, which might lead to poor sealing performance, galvanized steel plate is used for the fuel tank or a waterproof structured fuel tank is employed. On the other hand, since the gasket by the present invention is formed as the dual-membered gasket comprising the inner and outer sealing members, the inner sealing member 1 seals the unpainted surface area 16 so that it plays a main sealing member for preventing fuel from leaking, and the outer sealing member 2 plays a role of waterproof seal for sealing the painted surface area 17 so that it prevent the unpainted surface from rusting.

Figure 10:
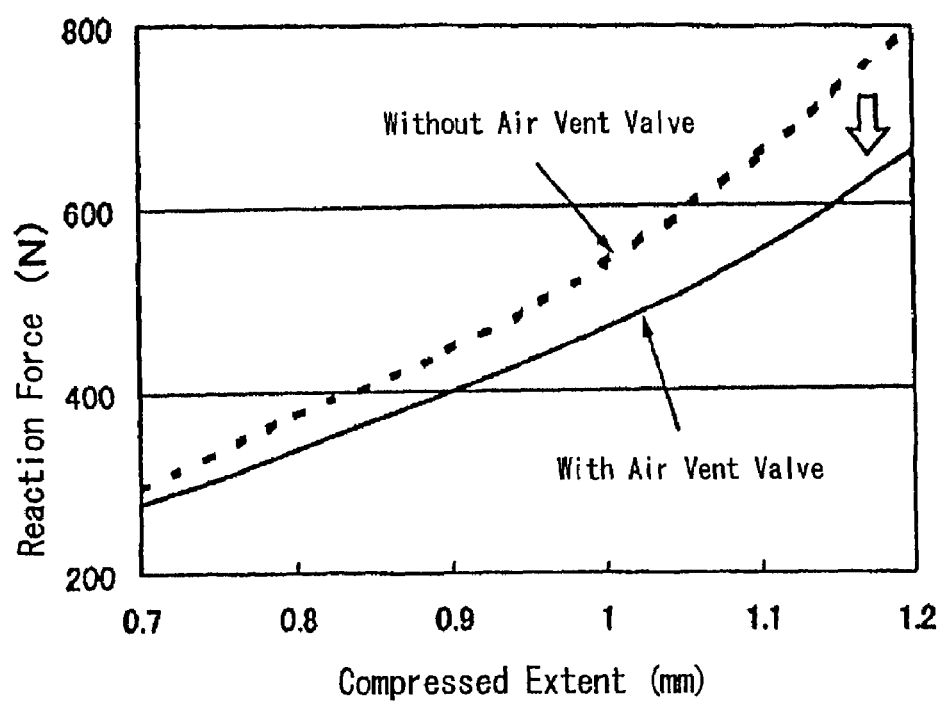
FIG. 10 is a chart showing a relation between compressed extent and reaction force of the gasket.

FIG. 10 is the chart showing the relation between compressed extent of gaskets and reaction force of the gaskets. FIG. 10 indicates that generated reaction force by a gasket with air vent valves can be controlled lower than that of a gasket without air vent valves, since in the gasket with air vent valves, air pressure in the recessed portions between the inner sealing member and outer sealing member is not raised.

In the present embodiment a case where the gasket is applied to the fuel pump is explained, but the gasket by the present invention can be widely applicable to various instruments of the same type as the fuel pump.

However, an object to which the gasket by the present invention is fitted should have a sufficient space for accommodating and a height for deforming the dual-membered gasket.

Hereinafter a structure and a molding method of the above-mentioned gasket are described in more detail.

[Structure]

The inner sealing member 1 has a structure which is rather hard to deform when compressed and the structure is different from that of the outer sealing member 2. Taking a sealing effect against fuel into consideration, the inner sealing member 1 has the structure which can generate higher reaction force when compressed. On the other hand, since strong reaction force from the outer sealing member 2 is not required, it has the lip sealing structure for preventing water penetration from outside.

As illustrated in FIG. 1, six connecting members 3 are formed between the inner and outer sealing members 1, 2.

Small recessed portions 9 are formed on the outer circumferences of the outer sealing members 2 at portions connecting to the connecting members 3. In other words, since areas around the recessed portions 9 generate smaller reaction forces when compressed compared with other portions of the outer sealing members 2, the areas, namely, the air vent valve portions 8 function as a check valve and vent air sealed in the recessed portions 4 between the inner and outer sealing members 1, 2.

A compressed extent of the gasket should be set preferably 5% to 30% of a height of the gasket.

A width of the connecting members 3 in a circular direction should be set 1% to 10%, preferably 3% to 7% larger than that of portions of the object to which the gasket is fitted, so that gasket is elastically fitted to the object, which prevent gasket from falling off from the object.

[Molding Method]

The main body "a" of the suctional gasket is formed by molding an elastic material. A vulcanized rubber, a thermoplastic elastomer or the like, which can have elasticity in applied circumstances, is preferable as the elastic material. Materials for the gasket should be selected depending on the kind of fluid to be sealed. For example, NBR, hydrogenated NBR, fluorocarbon rubber or the like is preferably used for fuel oil. EPDM, fluorocarbon rubber or the like is preferably used for aqueous fluid. If vulcanized rubber is required for the gasket, ingredients are weighed and kneaded before vulcanized, thus an unvulcanized rubber material is obtained.

Then a molding die for molding rubber gaskets is prepared. Shapes (hereinafter referred as "cavities") of the gasket by the present invention are formed beforehand in the molding die. The unvulcanized rubber material is placed in the preheated cavities of the opened molding die, and is vulcanized by keeping the molding die under a predetermined pressure, at a predetermined temperature for a predetermined period after the molding die is closed (a compression molding). The unvulcanized rubber material can be molded by other methods such as a transfer molding where the unvulcanized rubber material in a heated chamber is transferred into the cavities of the closed molding die; an injection molding where the unvulcanized rubber in a heated separate injecting mechanism is injected into the cavities of the molding die and the like.

The pressure, the temperature and the period for the vulcanizations are generally set 1 to 30 MPa, 100° C. to 200° C. and 2 to 30 minutes respectively. After vulcanized in predetermined conditions, the molding die is opened and the molded dual-membered suctional gasket is taken out of the molding die and the gasket is cooled to room temperature.

The invention claimed is:

1. A dual-membered suctional gasket, which has a function to prevent fluid from leaking when compressed, comprising:

an inner sealing member and an outer sealing member arranged on a plane perpendicular to a compressing direction;

a plurality of fitting holes formed between said inner sealing member and said outer sealing member for fitting in fitting members protruded central walls formed on an object to be sealed, said central walls functioning as guides to determine position and compressed degree of said dual-membered sectional gasket; and a plurality of connecting members formed between two neighboring said fitting holes for connecting and fixing said inner sealing member and said outer sealing member together, wherein:

upper lip portions and lower lip portions formed on outer circumferences of said outer sealing member, said inner sealing member or said both sealing members, such that said outer sealing member, said inner sealing member or said both sealing members have a < shaped cross-section;

air vent valve structures are formed on positions of said inner sealing member, said outer sealing member or said both sealing members corresponding to said plurality of said connecting members wherein said lip portions formed on positions of said sealing members corresponding to the connecting members are formed thinner than the other lip portions formed on positions of said sealing members adjacent to said fitting holes;

suction cup structures are formed, when a proper amount of air closed between said inner sealing member and said outer sealing member is vented via said air vent valve structures from said inner sealing member, said outer sealing member or said both sealing members by compressing said dual-membered gasket; and said vent valve structures function as a check valve which prevent air outside of said cup structures from flowing in.

2. The dual-membered gasket according to claim 1, wherein:

said inner sealing member and said outer sealing member are formed out of different materials.

* * * * *